US012085095B2

(12) United States Patent
Travis

(10) Patent No.: US 12,085,095 B2
(45) Date of Patent: Sep. 10, 2024

(54) WELLHEAD PRESSURE REDUCTION AND POWER GENERATING ASSEMBLY

(71) Applicant: Todd Anthony Travis, Humble, TX (US)

(72) Inventor: Todd Anthony Travis, Humble, TX (US)

( * ) Notice: Subject to any disclaimer, the term of this patent is extended or adjusted under 35 U.S.C. 154(b) by 55 days.

(21) Appl. No.: 17/700,276

(22) Filed: Mar. 21, 2022

(65) Prior Publication Data

US 2023/0094924 A1 Mar. 30, 2023

Related U.S. Application Data

(60) Provisional application No. 63/250,849, filed on Sep. 30, 2021.

(51) Int. Cl.

*E21B 34/02* (2006.01)
*F03B 13/00* (2006.01)
*F15B 1/027* (2006.01)

(52) U.S. Cl.

CPC .............. *F15B 1/027* (2013.01); *F03B 13/00* (2013.01); *F15B 2201/411* (2013.01)

(58) Field of Classification Search

CPC ................................ F03B 13/00; F15B 1/027
See application file for complete search history.

(56) References Cited

U.S. PATENT DOCUMENTS

| | | | | |
|---|---|---|---|---|
| 2,599,480 | A | 6/1952 | Hans | |
| 3,808,794 | A | 5/1974 | Wood | |
| 4,740,711 | A | 4/1988 | Sato | |
| 8,680,704 | B1 * | 3/2014 | Rooney | E21B 41/0085 290/54 |
| 10,458,206 | B2 | 10/2019 | Al-Dossary | |
| 2005/0217259 | A1 * | 10/2005 | Turchetta | F02C 9/18 60/648 |
| 2011/0285133 | A1 | 11/2011 | Gilbert | |
| 2012/0021315 | A1 * | 1/2012 | Tamura | H01M 8/04686 429/423 |
| 2014/0265328 | A1 * | 9/2014 | Van Blerk | F03B 11/004 290/43 |
| 2015/0219077 | A1 * | 8/2015 | Henderson | F16H 47/04 60/459 |
| 2020/0254888 | A1 * | 8/2020 | Weiss | F15B 15/00 |

* cited by examiner

*Primary Examiner* — Sean Gugger

(57) ABSTRACT

A wellhead pressure reduction and power generating assembly includes a wellhead, a supply pipe, a prime mover, a pump, and an accumulator bank. The wellhead is configured to supply a pressurized production fluid flow and is in fluid communication with the supply pipe. The prime mover is configured to induce a pressure drop within the pressurized production fluid flow and is in fluid communication with the supply pipe. The pump is configured to receive a mechanical force of the prime mover and operatively coupled with the prime mover. The accumulator bank is configured to accumulate a pressurized hydraulic fluid and is in fluid communication with the pump.

10 Claims, 8 Drawing Sheets

WELLHEAD PRESSURE REDUCTION AND POWER GENERATING ASSEMBLY

The current application claims a priority to the U.S. Provisional Patent application Ser. No. 63/250,849 filed on Sep. 30, 2021.

FIELD OF THE INVENTION

The present invention relates generally to equipment for the production, distribution, and transformation of energy. More specifically, the present invention is a system that induces a pressure reduction to compressed wellhead production fluid (gas or liquid) through a production motor (turbine) to pressurize an accumulator bank.

BACKGROUND OF THE INVENTION

Natural gas and oil are common sources of energy within the modern-day energy industry. While the sources of energy are constantly changing, natural gas and oil remain a staple of the industry that can provide both heat and electricity when burned. Natural gas and oil are commonly found in deep underground rock formations both onshore and offshore and require pipelines and wellheads to distribute them to desired locations. These extraction sites are usually located in remote areas such as the desert, jungles or, on drilling platforms at sea where the required electrical power is a scarcity. The electrical power at these sites can be needed for various types of processing and communications equipment and other necessities that cannot be easily obtained, requiring creative solutions to the problem. Many natural-gas well sites have utilized the natural gas obtained in one form or another to power any number of pieces of electronic equipment. These methods burn the natural gas collected to produce power; however, this results in the consumption of the natural gas collected, leaving less for sales, and emitting of carbon, NOX, and VOC's to the atmosphere.

An objective of the present invention is to provide users with a wellhead production mass flow fluid power system that generates hydraulic or pneumatic pressure within an accumulator unit without consuming the flowing media and with zero emissions. Then, the pressurized liquid or air power source can power any number of rotational, linear, or non-linear actuated devices without carbon emissions to the atmosphere or consumption of produced fluids. In order to accomplish creating the power unit, a preferred embodiment of the present invention comprises a production motor, a hydraulic or pneumatic pump, and an accumulator (dampener(s), storage tank(s), buffer chamber(s)) to store the pressurized produced energy. Further, the pressurized energy can be then utilized in a hydraulic or pneumatic motor coupled to a generator set to generate electricity. Further, the pressurized energy can be utilized in linear or non-linear actuators to produce forces in translation or rotation. Thus, the present invention is a power accumulator system that utilizes wellhead production fluids to transfer compressed energy to a variety of external equipment as needed, acting as an onsite fluid power source. Further, this power accumulator system tied to a generator set can be connected to an electrical grid to provide power to sites, plants, cities, counties, countries, etc. In other words, the present invention is able to effectively harness the energy lost that generally takes place within the decompression of the natural gas or fluid before exiting into the main distribution line.

SUMMARY OF THE INVENTION

The present invention is a wellhead hydraulic or pneumatic power system to help with producing energy at well sites. The present invention seeks to provide users with a pressurized accumulator to power rotational and/or translational motion, powering internal or external equipment. In order to accomplish this, the present invention comprises a prime mover (i.e., turbine, motor, or linear actuator) where production fluids flow through to generate rotational torque or linear force. The exiting production fluid is then routed to additional power units or processing equipment and/or to sales pipelines. Further, a pump utilizes the rotational energy of the production motor to pressurize an accumulator. Additionally, the accumulator sends pressurized media (i.e., fluid or air) some distance away from the wellhead into a power unit where it is used by equipment needing hydraulic or pneumatic power. Further, if the power unit is hydraulic the returning fluid is sent to the reservoir after being used. Further, the returning hydraulic fluid may be routed through a cooler before being returned to the reservoir. Further, the returning fluid may be used to heat the gas to prevent freezing or be used in a cogeneration/heat recovery apparatus. Thus, the present invention is a hydraulic or pneumatic power system that utilizes wellhead production fluids to power a variety of equipment as needed, acting as an onsite power source.

DETAILED DESCRIPTION OF THE INVENTION

All illustrations of the drawings are for the purpose of describing selected versions of the present invention and are not intended to limit the scope of the present invention.

Figure 1:
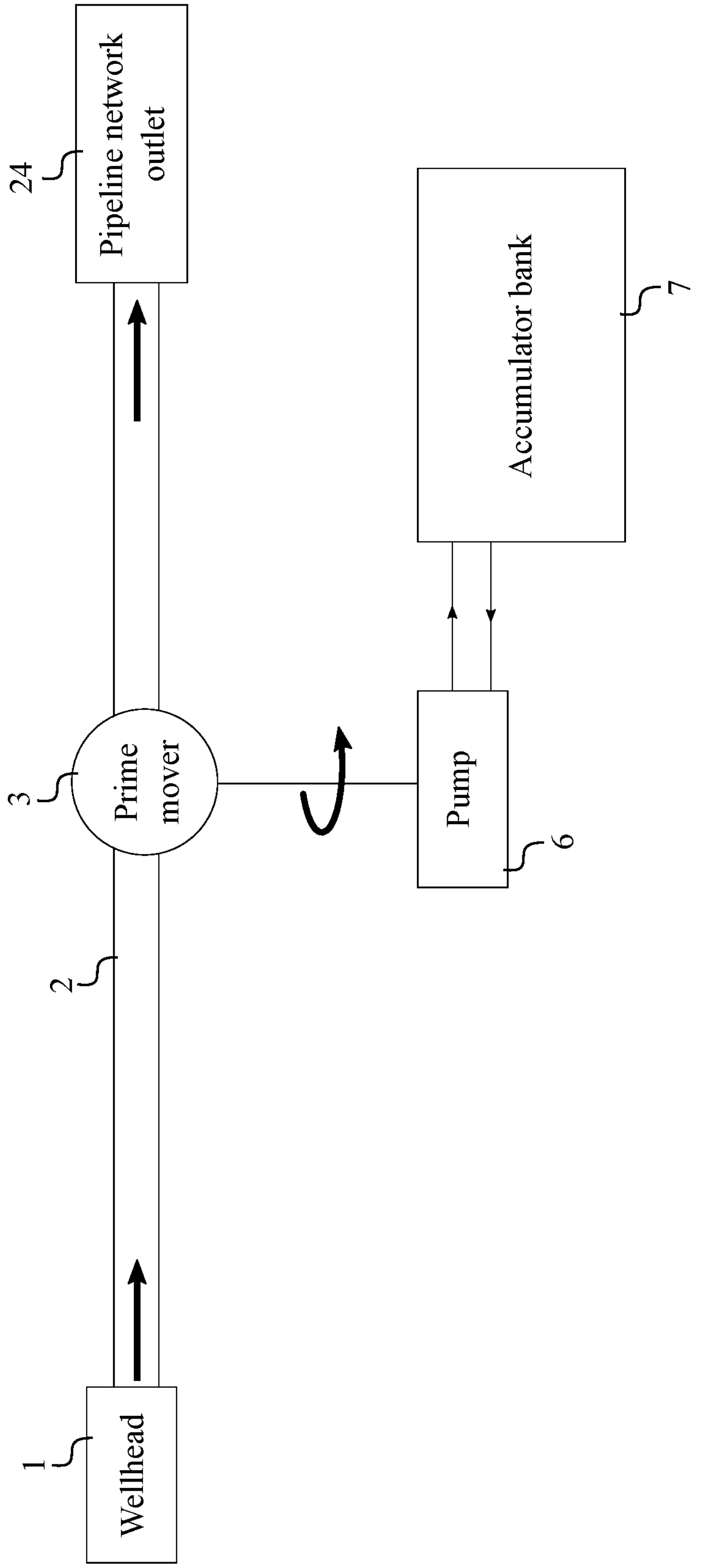
FIG. 1 is a schematic illustration showing the overall configuration of the present invention.

The present invention is a wellhead pressure reduction and power generating assembly that utilizes natural gas or liquid flowing into a production motor or turbine to create rotational torque or a linear actuator to create translational force. The present invention intends to provide users with a system that can provide power to remote well sites or any area needing power. As shown in FIG. 1, the present invention comprises a wellhead 1, a supply pipe 2, at least one prime mover 3, at least one pump 6, and at least one accumulator bank 7.

In reference to the general configuration of the present invention, as shown in FIG. 1, the wellhead 1 that provides the structural and pressure-containing interface for the drilling and production equipment is configured to supply a pressurized production fluid flow. The wellhead 1 is in fluid communication with the supply pipe 2 so that the pressurized production fluid flow can be discharged into the supply pipe 2. The prime mover 3 is configured to induce a pressure drop within the pressurized production fluid flow. The present invention can utilize a production motor, a turbine, or a linear actuator as the prime mover 3. More specifically, the prime mover 3 is in fluid communication with the supply pipe 2 and actuated by the discharge momentum of the pressurized production fluid flow. As a result, the operation of the prime mover 3 is able to induce the pressure drop within the pressurized production fluid flow. The pump 6 is configured to receive a mechanical force of the prime mover 3 and operatively coupled with the prime mover 3 utilizing an industry standard gearbox system. The mechanical force of the prime mover 3 can differ depending upon the type of the prime mover 3 utilized within the present invention. For example, when the prime mover 3 is the production motor or the turbine within the present invention, a rotational torque is considered as the mechanical force. When the prime mover 3 is the linear actuator within the present invention, a translational force is considered as the mechanical force. As a result, the mechanical force of the prime mover 3 is able to rotate the pump 6. The accumulator bank 7 is configured to accumulate a pressurized hydraulic fluid or pressurized air and is in fluid communication with the pump 6. The accumulator bank 7 functions as the onsite fluid power source so that electricity can be generated, linear or non-linear actuators can produce forces in translation or rotation, and/or a variety of external equipment can be powered as needed.

In reference to FIG. 1, the wellhead 1 provides the suspension point and pressure seals for the underground casing that runs from the bottom of the bedrock to the surface pressure control equipment. The wellheads are typically welded onto the first string of casing, which has been cemented in place during drilling operations, to form an integral structure of the well. The wellhead 1 utilized within the present invention is similar to existing wellheads within the drilling industry. As explained before, the pressurized production fluid flow from the bedrock is discharged into the supply pipe 2 via the wellhead 1 so that the present invention can be implemented.

In reference to FIG. 1, the supply pipe 2 is a large diameter pipe that enables the flowing of the pressurized natural gas. The supply pipe 2 is made to complement industry standard specifications and regulations to insure the reliability and safety. In other words, the supply pipe 2 is able to withstand the exiting pressure of the pressurized production fluid flow until the pressurized production fluid flow reaches the prime mover 3.

Figure 2:
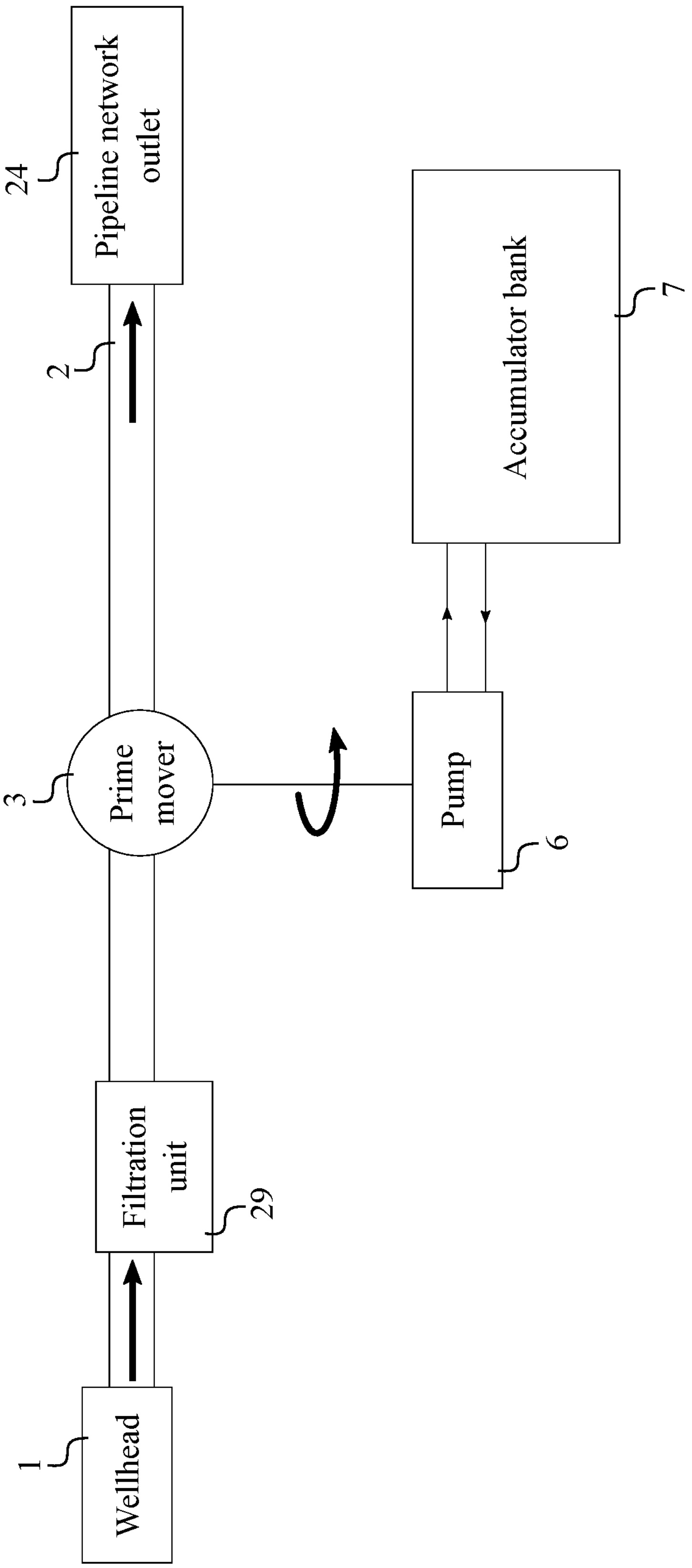
FIG. 2 is a schematic illustration showing the overall configuration of the present invention with the filtration unit.

In reference to FIG. 2, the present invention may further comprise at least one filtration unit 29 that is integrated into the supply pipe 2. The filtration unit 29 is positioned in between the wellhead 1 and the prime mover 3 so that the pressurized production fluid flow can be purified according to the specification of the prime mover 3 to maximize the life expectancy of the prime mover 3.

Figure 5:
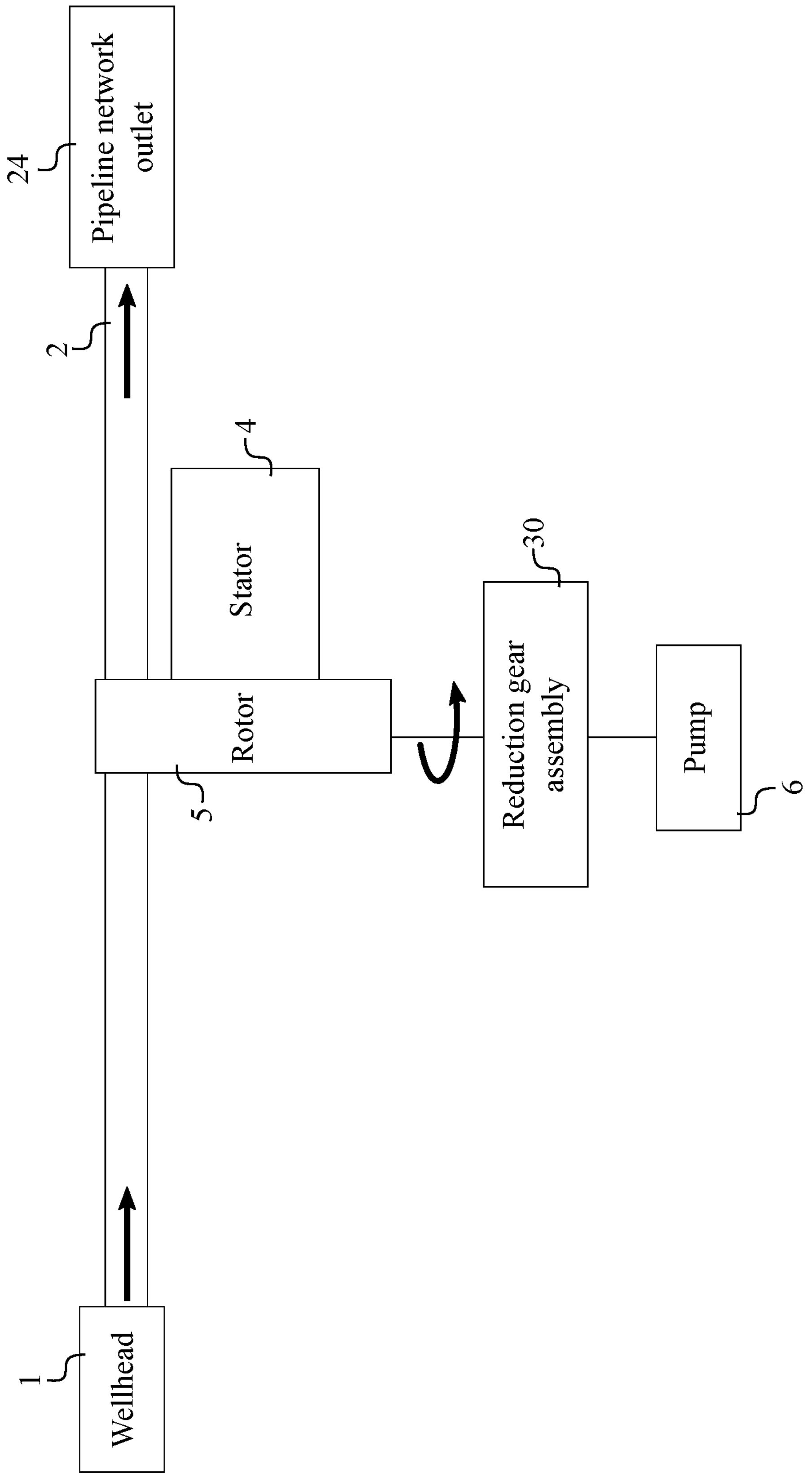
FIG. 5 is a schematic illustration showing the configuration of the prime mover (rotor/stator) within the present invention, wherein the prime mover being the production motor or the turbine.

In reference to FIG. 5, in some embodiment of the present invention, the prime mover 3 is a rotary mechanical device (production motor or turbine) that extracts energy from the fluid flow and converts it into rotational energy. More specifically, the prime mover 3 may comprise a stator 4 and a rotor 5 similar to industry standard rotary mechanical devices. The stator 4 is mounted adjacent to the supply pipe 2 so that the prime mover 3 can be stationary positioned with respect to the supply pipe 2. The rotor 5 is rotatably engaged with the pump 6 as the rotor 5 is able to transform the fluid flow energy of the pressurized production fluid flow into rotational mechanical energy. As a result, the prime mover 3 is also able to induce the pressure drop into the pressurized production fluid flow that is generally carried out by an industry standard pressure reducing mechanism such as a chock.

Figure 6:
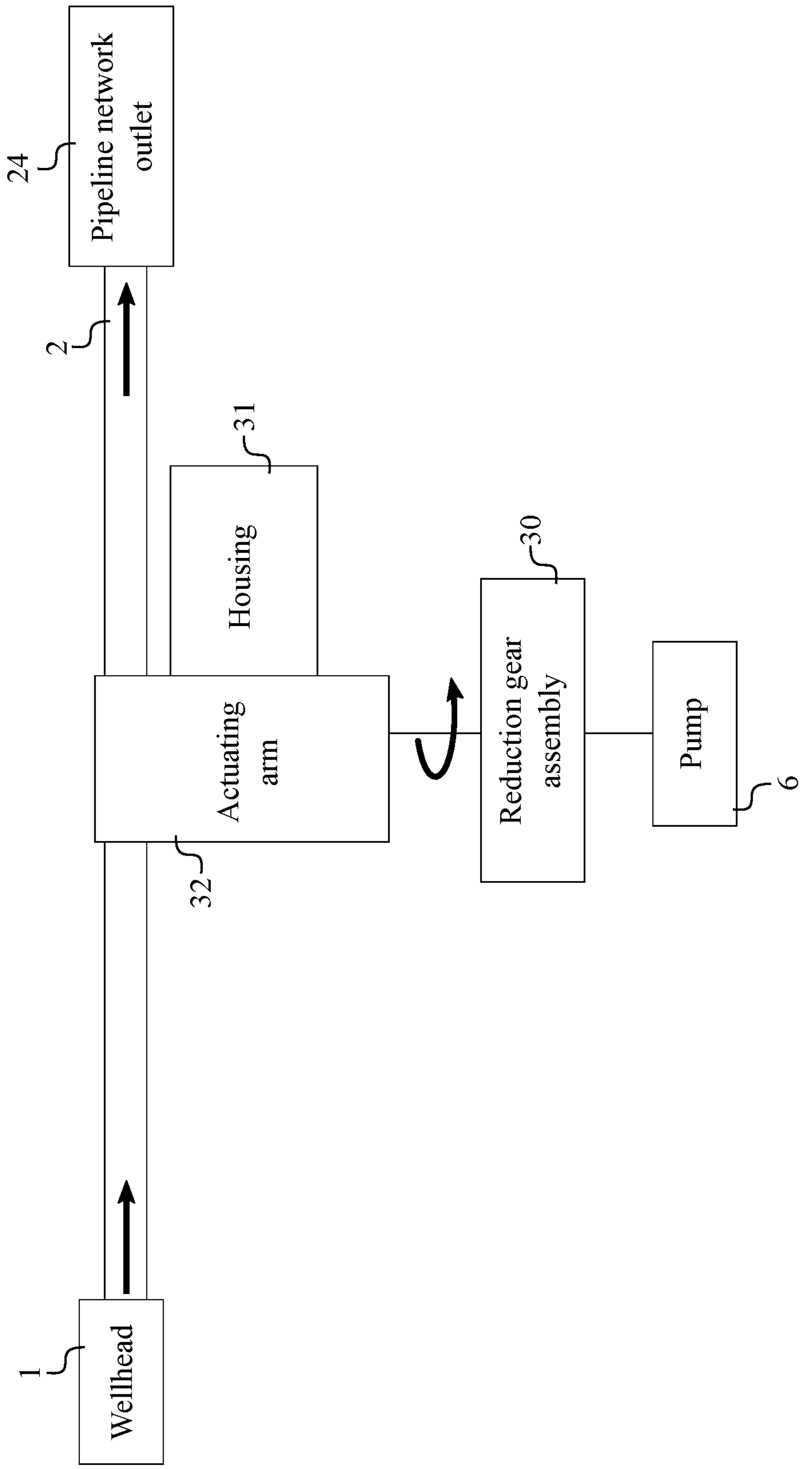
FIG. 6 is a schematic illustration showing the configuration of the prime mover within the present invention, wherein the prime mover being the linear actuator.

In reference to FIG. 6, in some embodiment of the present invention, the prime mover 3 is the linear actuator that extracts energy from the fluid flow and converts this energy into translational force. More specifically, the prime mover 3 may comprise a housing 31 and an actuating arm 32 similar to industry standard linear actuating devices. The housing 31 is mounted adjacent to the supply pipe 2 so that the prime mover 3 can be stationary positioned with respect to the supply pipe 2. The actuating arm 32 is operatively engaged with the pump 6 as the actuating arm 32 is able to transform the fluid flow energy of the pressurized production fluid flow into translational force. As a result, the prime mover 3 is also able to induce the pressure drop into the pressurized production fluid flow that is generally carried out by an industry standard pressure reducing mechanism such as a chock.

In other words, the continuous operation of the prime mover 3 utilizes some of the kinetic energy of the pressurized production fluid flow so that the exiting pressure of the pressurized production fluid flow can be reduced to accommodate the allowable pressure levels of a pipeline network outlet 24 of the present invention. The pipeline network outlet 24 is in fluid communication with the supply pipe 2, opposite of the wellhead 1, thus allowing the pressurized production fluid flow to be distributed to desired locations.

In some embodiment of the present invention, the at least one prime mover 3 can be a plurality of prime movers 3. Depending upon system specifications, each of the plurality of prime movers 3 is in fluid communication with the supply pipe 2 via a serial configuration or a parallel configuration.

Figure 3:
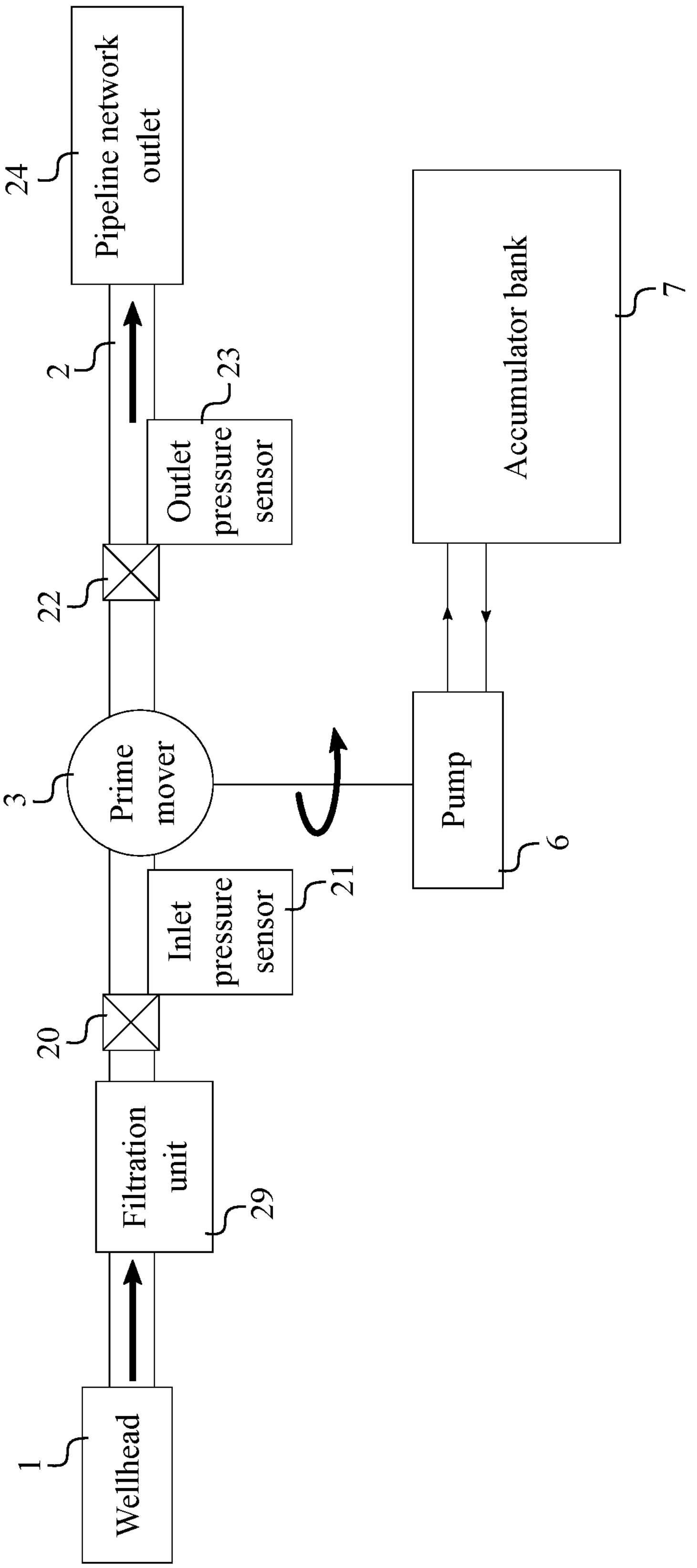
FIG. 3 is a schematic illustration showing the overall configuration of the present invention with the inlet regulator, the inlet measurement device, the outlet regulator, and the outlet measurement device.

In reference to FIG. 3, the present invention may further comprise an inlet regulator 20 and an inlet measurement device 21. The inlet regulator 20 is operatively coupled to the supply pipe 2 and positioned in between the wellhead 1 and the prime mover 3. The inlet regulator 20 selectively reduces the pressure of the pressurized production fluid flow to established appropriate downstream pressure levels within the supply pipe 2. The inlet measurement device 21 is mounted within the supply pipe 2 and positioned in between the inlet regulator 20 and the prime mover 3. The inlet measurement device 21 operates in conjunction with the inlet regulator 20 to established appropriate downstream pressure levels within the supply pipe 2.

In reference to FIG. 3, the present invention may further comprise an outlet regulator 22 and an outlet measurement device 23. The outlet regulator 22 is operatively coupled to the supply pipe 2 and positioned in between the pipeline network outlet 24 and the prime mover 3. The outlet regulator 22 selectively reduces the pressure of the pressurized production fluid flow to established appropriate downstream pressure levels within the supply pipe 2. The outlet measurement device 23 is mounted within the supply pipe 2 and positioned in between the outlet regulator 22 and the pipeline network outlet 24. The outlet measurement device 23 operates in conjunction with the outlet regulator 22 to established appropriate downstream pressure levels within the supply pipe 2.

Figure 4:
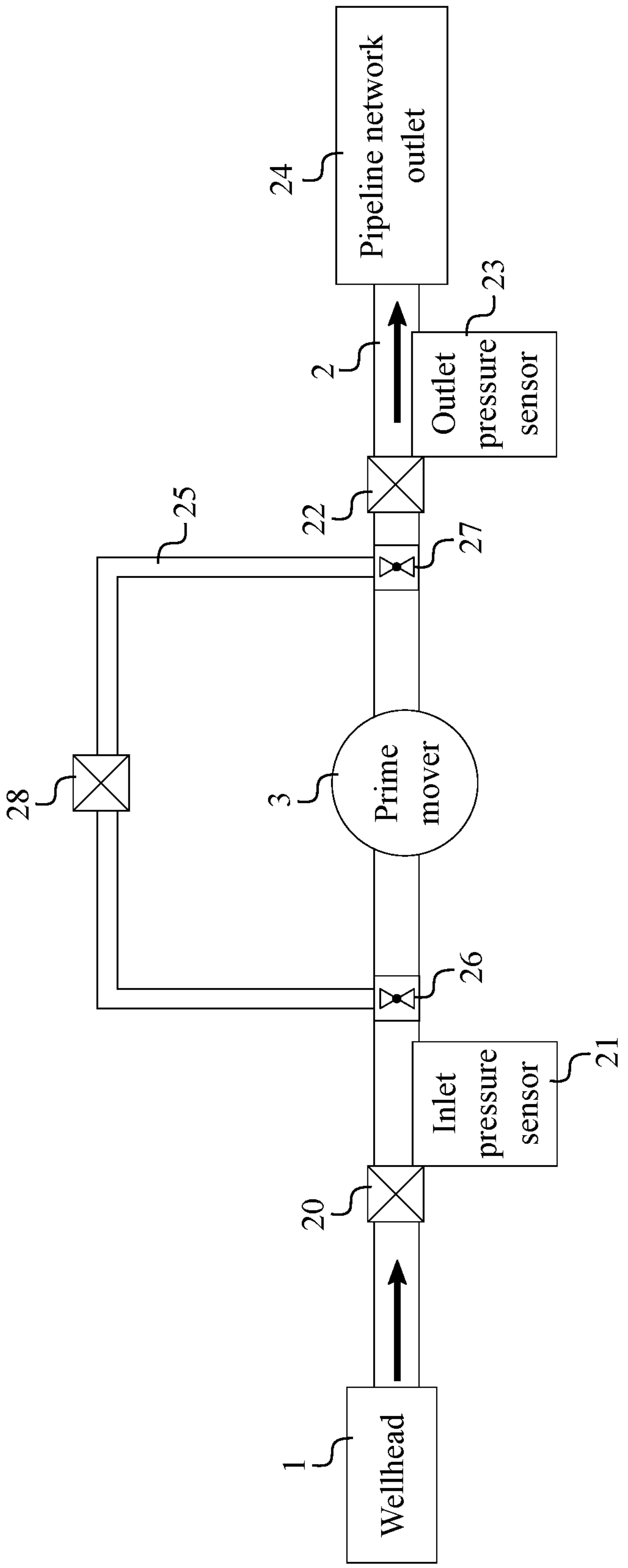
FIG. 4 is a schematic illustration showing the configuration of the bypass conduit and the bypass regulator within the present invention.

In reference to FIG. 4, the present invention may further comprise a bypass conduit 25 and a bypass regulator 28. The bypass conduit 25 and the bypass regulator 28 establish a reroute for the pressurized production fluid flow around the prime mover 3. More specifically, an inlet connector valve 26 of the bypass conduit 25 is in fluid communication with the supply pipe 2, wherein the inlet connector valve 26 of the bypass conduit 25 is positioned in between the inlet measurement device 21 and the prime mover 3. An outlet connector valve 27 of the bypass conduit 25 is in fluid communication with the supply pipe 2, wherein the outlet connector valve 27 of the bypass conduit 25 is positioned in between the prime mover 3 and the outlet regulator 22. The bypass regulator 28 is operatively coupled to the bypass conduit 25 so that the bypass regulator 28 can selectively reduce the pressure of the pressurized production fluid flow. For example, when the prime mover 3 is operational, the bypass regulator 28 is configured at a closed position so that the pressurized production fluid flow can be discharged through the prime mover 3. When the prime mover 3 is non-operation due to maintains or repairs, the bypass regulator 28 is configured at an opened position so that the pressurized production fluid flow can be discharged through the bypass conduit 25.

In reference to FIG. 1-3, the pump 6 is a mechanical source of power that converts the rotational mechanical energy into hydraulic energy or pneumatic energy. In other words, depending upon different configurations of the present invention, the pump 6 can be a hydraulic pump or a pneumatic pump. The pump 6 generates flow with enough power to overcome pressure induced by the load at an outlet of the pump 6. When the pump 6 operates as the hydraulic pump, the pump 6 creates a vacuum at an inlet of the pump 6. Resultantly, hydraulic fluid from a reservoir is forced into the inlet of the pump 6. Then, the mechanical action of the pump 6 delivers the hydraulic fluid to the outlet of the pump 6 and forces the hydraulic fluid into a hydraulic system. When the pump 6 operates as the pneumatic pump, the pump 6 creates a vacuum at an inlet of the pump 6. Resultantly, a flow of air is forced into the inlet of the pump 6. Then, the mechanical action of the pump 6 delivers the flow of air to the outlet of the pump 6 and forces the flow of air fluid into a pneumatic system.

In order to expand upon the hydraulic system, the present invention utilizes the accumulator bank 7 so that the hydraulic energy or the pneumatic energy can be continuously generated and stored for later use. When the present invention utilizes a hydraulic pump as the pump 6, the accumulator bank 7 has to be a hydraulic bank. When the present invention utilizes a pneumatic pump as the pump 6, the accumulator bank 7 has to be a pneumatic bank. Since the accumulator bank 7 is in fluid communication with the pump 6, the hydraulic fluid or the flow of air of the pump 6 create a closed loop conduit circuit with the accumulator bank 7. The pump 6 then utilizes the hydraulic fluid or the flow of air to pressurize the accumulator bank 7 thus expanding the storage of hydraulic energy within the hydraulic system or pneumatic energy within the pneumatic system. Additionally, the accumulator bank 7 may comprise a bypass allowing the pressurized hydraulic fluid or pressurized air to temporarily bypass the accumulator bank 7 when the hydraulic system is at max capacity thus returning to the hydraulic fluid reservoir to be reutilized or when the pneumatic system is at max capacity thus releasing air.

Figure 7:
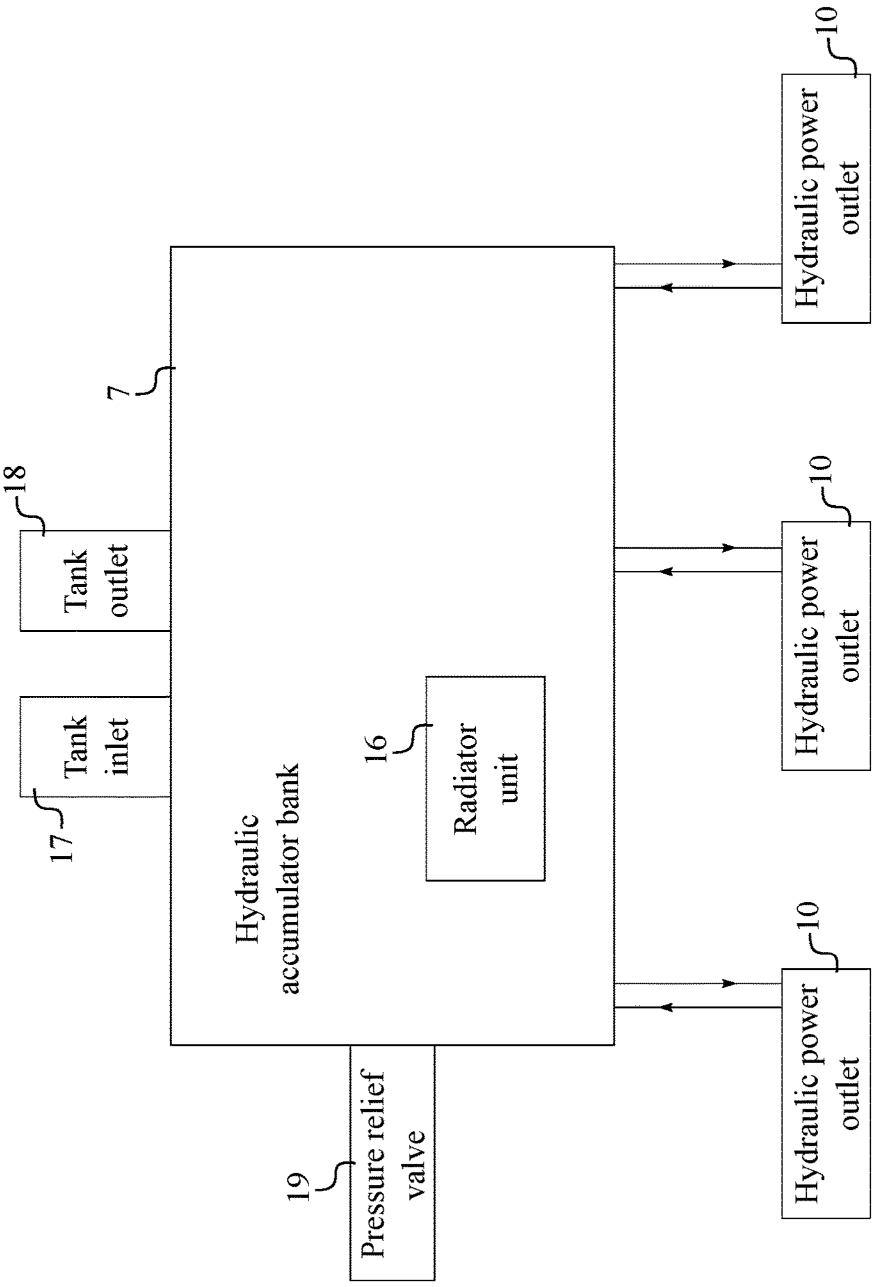
FIG. 7 is a schematic illustration showing the configuration of the accumulator bank within the present invention.
Figure 8:
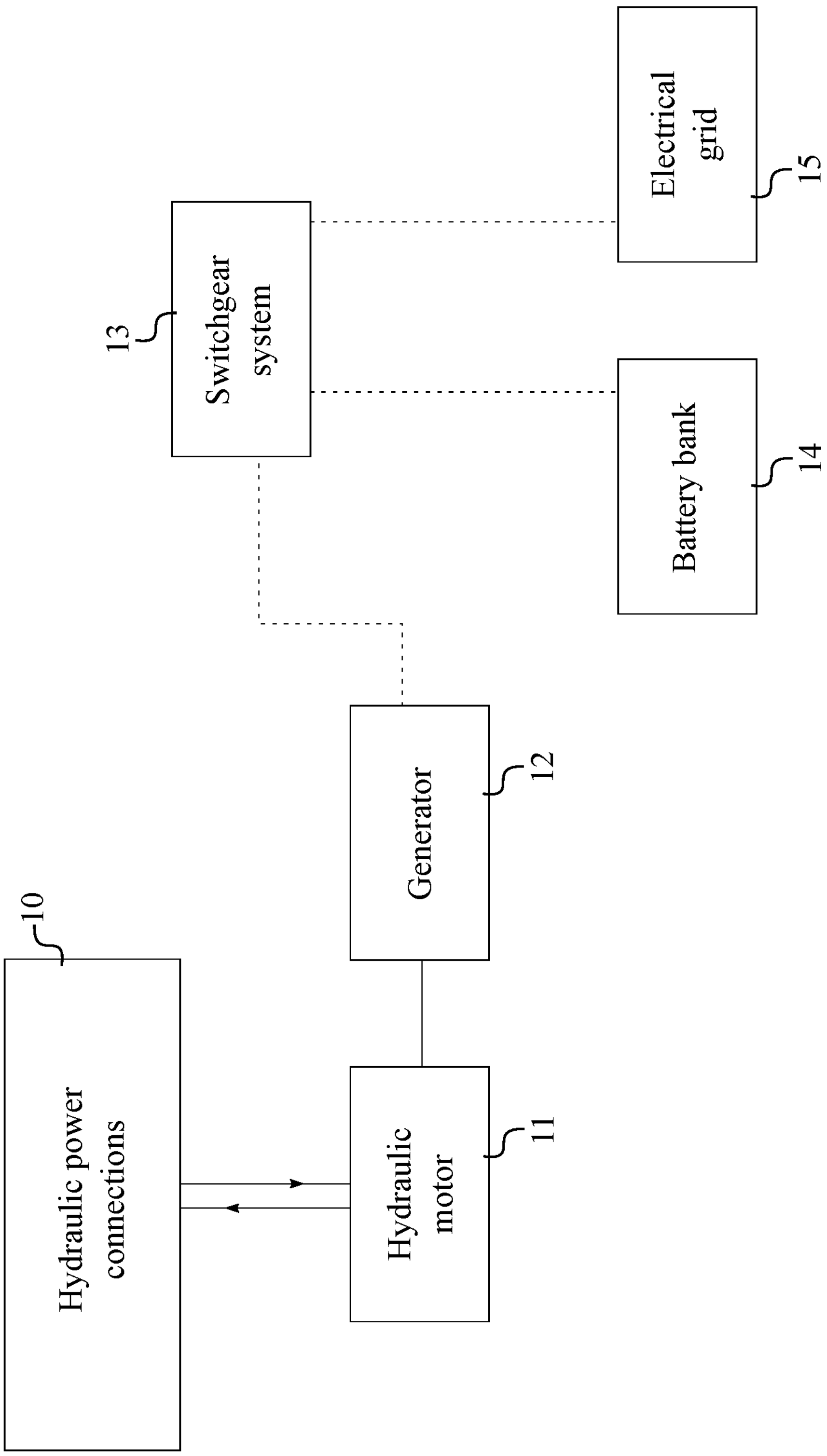
FIG. 8 is a schematic illustration showing the configuration of one of the pressurized power outlets of the accumulator bank within the present invention.

In reference to FIG. 7, the present invention may further comprise a radiator unit 16 that is integrated into the accumulator bank 7. More specifically, the radiator unit 16 cools down the hydraulic fluid within the closed loop conduit circuit to maintain safe and usable temperature of the hydraulic fluid. The radiator unit 16 is automatically controlled via a programed parameters such as a maximum temperature of the hydraulic fluid, a minimum temperature of the hydraulic fluid, a system shut off temperature, a maximum operational time, and other similar specifications.

In reference to FIG. 7, the present invention may further comprise an external hydraulic tank inlet 17 and an external hydraulic tank outlet 18. The external hydraulic tank inlet 17 is integrated into the accumulator bank 7 so that a flow of hydraulic can be supplied into the accumulator bank 7 from at least one reservoir. The external hydraulic tank outlet 18 is integrated into the accumulator bank 7 thus allowing the flow of hydraulic that enters into the accumulator bank 7 via the external hydraulic tank inlet 17 to be discharged back into the reservoir. Due to the fact that the reservoir maintains a closed loop conduit circuit with the accumulator bank 7, the present invention is able to maximize the generation of hydraulic energy.

In reference to FIG. 7, the present invention may further comprise a pressure relief valve 19 that is integrated into the accumulator bank 7. The pressure relief valve 19 functions as a bleed off device to allow excess air to be emitted back into the atmosphere when the accumulator bank 7 is at max capacity.

In reference to FIG. 7, the present invention may further comprise a plurality of pressurized power outlets 10. The plurality of pressurized power outlets 10 being in fluid communication with the accumulator bank 7. More specifically, the plurality of pressurized power outlets 10 allows for various hydraulic or pneumatic devices, such as but not limited to a motor coupled to a generator and a hydraulic power tool to be operatively coupled with the accumulator bank 7.

In reference to FIG. 7, when the motor 11 and a generator 12 are operatively coupled to the accumulator bank 7, a switchgear system 13 is utilized within the present invention. More specifically, the motor 11 is in fluid communication with one of the plurality of pressurized power outlets 10 so that the motor 11 can be powered from the pressurized hydraulic fluid or pressurized air of the accumulator bank 7. The generator 12 is operatively coupled with the motor 11 as the motor 11 is able to rotate the generator 12 at a constant rate. The switchgear system 13 is electrically connected with the generator 12 and operated within the present invention so that electrical equipment can be de-energized to allow work to be done and to clear faults downstream. Generated electricity within the generator 12 can be stored within a battery bank 14 system that is electrically connected to the switchgear system 13 or upload into an electrical grid 15 that is electrically connected to the switchgear system 13.

In reference to FIG. 5 and FIG. 6, the present invention may further comprise a reduction gear assembly 30. The reduction gear assembly 30 is able to reduce one or more input forces into a single outlet force so that the present invention can be operational according to the system specification. More specifically, the pump 6 is operatively coupled with the prime mover 3 through the reduction gear assembly 30.

Although the invention has been explained in relation to its preferred embodiment, it is to be understood that many other possible modifications and variations can be made without departing from the spirit and scope of the invention as hereinafter claimed.

What is claimed is:

1. A wellhead pressure reduction and power generating assembly comprising:

a wellhead;

a supply pipe;

at least one prime mover; at least one pump;

at least one accumulator bank; at least one filtration unit;

a plurality of pressurized power outlets;

a motor;

a generator; a switchgear system; a reduction gear assembly;

a radiator unit;

the wellhead being configured to supply a pressurized production fluid flow;

the prime mover being configured to induce a pressure drop within the pressurized production fluid flow;

the pump being configured to receive a mechanical force of the prime mover;

the accumulator bank being configured to accumulate a pressurized hydraulic fluid;

the wellhead being in fluid communication with the supply pipe;

the prime mover being in fluid communication with the supply pipe;

the pump being operatively coupled with the prime mover;

the accumulator bank being in fluid communication with the pump forming a closed loop conduit circuit containing the hydraulic fluid;

the filtration unit being integrated into the supply pipe;

the filtration unit being configured to process an entirety of the pressurized production flow;

the filtration unit being positioned in between the wellhead and the prime mover;

the plurality of pressurized power outlets being in fluid communication with the accumulator bank;

the plurality of pressurized power outlets being mounted external to the accumulator bank; the motor being in fluid communication with one of the plurality of pressurized power outlets;

the generator being operatively coupled with the motor;

the switchgear system being electrically connected with the generator;

the pump being operatively coupled with the prime mover through the reduction gear assembly; and the radiator unit being integrated into the accumulator bank to cool the hydraulic fluid within the closed loop conduit circuit.

2. The wellhead pressure reduction and power generating assembly as claimed in claim 1 comprising:

an inlet regulator;

an inlet measurement device;

the inlet regulator being operatively coupled to the supply pipe, wherein the inlet regulator selectively reduces the pressure of the pressurized production fluid flow;

the inlet regulator being positioned in between the wellhead and the prime mover;

the inlet measurement device being mounted within the supply pipe; and the inlet measurement device being positioned in between the inlet regulator and the prime mover.

3. The wellhead pressure reduction and power generating assembly as claimed in claim 1 comprising:

a pipeline network outlet;

an outlet regulator;

an outlet measurement device;

the pipeline network outlet being in fluid communication with the supply pipe, opposite of the wellhead;

the outlet regulator being operatively coupled to the supply pipe, wherein the outlet regulator selectively reduces the pressure of the pressurized production fluid flow;

the outlet regulator being positioned in between the pipeline network outlet and the prime mover;

the outlet measurement device being mounted within the supply pipe; and the outlet measurement device being positioned in between the outlet regulator and the pipeline network outlet.

4. The wellhead pressure reduction and power generating assembly as claimed in claim 1 comprising:

a bypass conduit;

a bypass regulator;

an inlet connector valve of the bypass conduit being in fluid communication with the supply pipe;

an outlet connector valve of the bypass conduit being in fluid communication with the supply pipe; and the bypass regulator being operatively coupled to the bypass conduit, wherein the bypass regulator selectively reduces the pressure of the pressurized production fluid flow.

5. The wellhead pressure reduction and power generating assembly as claimed in claim 4 comprising:

an inlet measurement device;

an outlet regulator;

the inlet connector valve of the bypass conduit being positioned in between the inlet measurement device and the prime mover; and the outlet connector valve of the bypass conduit being positioned in between the prime mover and the outlet regulator.

6. The wellhead pressure reduction and power generating assembly as claimed in claim 1 comprising:

the prime mover comprising a stator and a rotor;

the stator being mounted adjacent to the supply pipe; and the rotor being rotatably engaged mounted within the stator; and the rotor being torsionally connected to the pump.

7. The wellhead pressure reduction and power generating assembly as claimed in claim 1 comprising:

a battery bank; and the battery bank being electrically connected to the switchgear system.

8. The wellhead pressure reduction and power generating assembly as claimed in claim 1 comprising:

an electrical grid; and the electrical grid being electrically connected to the switchgear system.

9. The wellhead pressure reduction and power generating assembly as claimed in claim 1 comprising:

an external hydraulic tank inlet;

an external hydraulic tank outlet;

the external hydraulic tank inlet being integrated into the accumulator bank; and the external hydraulic tank outlet being integrated into the accumulator bank.

10. The wellhead pressure reduction and power generating assembly as claimed in claim 1 comprising:

a pressure relief valve; and the pressure relief valve being integrated into the accumulator bank.

* * * * *